(12) United States Patent
Díaz

(10) Patent No.: US 6,581,461 B1
(45) Date of Patent: Jun. 24, 2003

(54) ELECTRO-OPTIC SENSOR FOR LEVELMETER PROVIDING OUTPUT SIGNAL WITH FREQUENCY MODULATED BY SURFACE LEVEL

(75) Inventor: Herman Díaz, Estado (MX)

(73) Assignee: TRN Business Trust, Dallas, TX (US)

( * ) Notice: Subject to any disclaimer, the term of this patent is extended or adjusted under 35 U.S.C. 154(b) by 0 days.

(21) Appl. No.: 09/578,938

(22) Filed: May 25, 2000

(51) Int. Cl.[7] ............................................. G01F 23/292

(52) U.S. Cl. ..................... 73/290.004; 73/304; 250/577

(58) Field of Search .............................. 73/290 R, 304; 250/577

(56) References Cited

U.S. PATENT DOCUMENTS

| | | | |
|---|---|---|---|
| 1,963,330 A | 6/1934 | Lumme | 73/37 |
| 2,127,422 A | 8/1938 | Phaneuf | 177/311 |
| 3,148,542 A | 9/1964 | Clift, Jr. | 73/308 |
| 3,824,587 A | 7/1974 | Fowler | 340/347 |
| 3,949,606 A | 4/1976 | Blancett | 73/229 |
| 4,051,726 A | 10/1977 | Hastbacka | 73/290 R |
| 4,065,968 A | 1/1978 | Sunagawa | 73/313 |
| 4,134,022 A * | 1/1979 | Jacobsen | 250/577 |
| 4,242,590 A * | 12/1980 | von Tluck | 250/577 |
| 4,290,059 A | 9/1981 | Noyes et al. | 340/624 |
| 4,320,394 A * | 3/1982 | John, Jr. | 340/618 |
| 4,422,328 A | 12/1983 | Luchessa et al. | 73/313 |
| 4,427,132 A | 1/1984 | Thomson | 222/23 |
| 4,598,742 A | 7/1986 | Taylor | 141/95 |
| 4,688,028 A | 8/1987 | Conn | 340/615 |
| 4,786,846 A | 11/1988 | Uchida | 318/482 |
| 4,859,987 A * | 8/1989 | Markus | 340/450 |
| 4,912,976 A | 4/1990 | Labriola, II | 73/290 R |
| 4,950,998 A * | 8/1990 | Kramer et al. | 324/674 |
| 4,977,528 A | 12/1990 | Norris | 364/571.04 |
| 4,983,855 A | 1/1991 | Grimes | 250/577 |
| 5,035,581 A * | 7/1991 | McGuire et al. | 417/36 |
| 5,042,299 A * | 8/1991 | Wells | 73/304 C |
| 5,043,912 A | 8/1991 | Reus | 364/509 |
| 5,105,085 A * | 4/1992 | McGuire et al. | 250/343 |
| 5,136,883 A | 8/1992 | Jannotta | 73/309 |
| 5,154,079 A | 10/1992 | Lupoli | 73/308 |
| 5,156,048 A | 10/1992 | DeFigueiredo et al. | 73/308 |
| 5,251,482 A | 10/1993 | Bates et al. | 73/290 V |
| 5,265,032 A | 11/1993 | Patel | 364/509 |
| 5,275,951 A * | 1/1994 | Chow et al. | 436/50 |
| 5,279,157 A * | 1/1994 | Mattis et al. | 73/290 R |
| 5,297,423 A | 3/1994 | Keating et al. | 73/49.2 |
| 5,309,212 A | 5/1994 | Clark | 356/5 |
| 5,351,036 A | 9/1994 | Brown | 340/618 |
| 5,351,548 A | 10/1994 | Briggs et al. | 73/718 |
| 5,502,377 A | 3/1996 | Freund | 324/175 |
| 5,535,625 A | 7/1996 | Levy | 73/290 V |

(List continued on next page.)

FOREIGN PATENT DOCUMENTS

| | | | |
|---|---|---|---|
| GB | 2 147 697 A | 5/1985 | G01F/23/00 |
| WO | WO 00/02015 | 1/2000 | |

OTHER PUBLICATIONS

PCT Notification of Transmittal of the International Search Report or the Declaration and International Search Report re International Appln. PCT/US 01/50966 (6 pages), Sep. 16, 2002.

Primary Examiner—Daniel S. Larkin
Assistant Examiner—André K. Jackson
(74) Attorney, Agent, or Firm—Baker Botts L.L.P.

(57) ABSTRACT

An opto-electric levelmeter having a sensor that provides an output signal whose frequency represents the surface level of liquid in a container. The sensor's circuitry includes an oscillation circuit that uses "optical feedback" to modulate the sensor output signal. The signal is delivered to a monitor that provides an output signal for the user. The monitor also permits adjustment for both high and low levels of a particular container. The monitor sends electrical energy to the sensor, and receives the sensor output signal on the same electrical link.

20 Claims, 4 Drawing Sheets

U.S. PATENT DOCUMENTS

| | | | |
|---|---|---|---|
| 5,609,059 A | | 3/1997 | McEwan .................. 73/290 R |
| 5,636,548 A | | 6/1997 | Dunn et al. ................... 73/313 |
| 5,642,097 A | | 6/1997 | Martel ....................... 340/618 |
| 5,648,844 A | * | 7/1997 | Clark ......................... 250/577 |
| 5,705,733 A | | 1/1998 | Jannotta ......................... 73/1 |
| 5,751,611 A | * | 5/1998 | Jamieson ..................... 345/35 |
| 5,755,136 A | | 5/1998 | Getman et al. ........... 73/290 V |
| 5,842,374 A | | 12/1998 | Chang ..................... 73/290 R |
| 5,880,480 A | * | 3/1999 | Ellinger et al. ............. 250/577 |
| 5,895,848 A | | 4/1999 | Wilson et al. ............ 73/290 V |
| 5,975,102 A | | 11/1999 | Schalk .......................... 137/2 |
| 6,052,190 A | | 4/2000 | Sekowski et al. ........... 356/376 |
| 6,239,709 B1 | * | 5/2001 | Dykstra et al. ............. 340/618 |
| 6,272,911 B1 | * | 8/2001 | Hinkle ...................... 73/118.1 |
| 6,336,362 B1 | | 1/2002 | Duenas ........................ 73/313 |

* cited by examiner

ELECTRO-OPTIC SENSOR FOR LEVELMETER PROVIDING OUTPUT SIGNAL WITH FREQUENCY MODULATED BY SURFACE LEVEL

TECHNICAL FIELD OF THE INVENTION

This invention relates to measurement devices, and more particularly to an electro-optic device for measuring the fullness level of liquid in a container.

BACKGROUND OF THE INVENTION

Continuous level sensing is used for a vast number of applications, perhaps the most familiar being for tanks containing liquids, such as a fuel tank. Unlike, a limit levelmeter (also known as a switch levelmeter), a continuous levelmeter must provide a continuous range of measurements from empty to full.

There are many different types of level meters, each type having a different principle of operation. Some of the more common types are float levelmeters, capacitive levelmeters, photoelectric levelmeters, and ultrasonic levelmeters.

Some levelmeters, notably ultrasonic levelmeters, have used signal frequency to provide level information. For example, one type of ultrasonic levelmeter uses an emitter to direct ultrasonic waves into a cavity above the liquid. The resulting waves resonate at the cavity's resonant frequency and at harmonics of that frequency. At a different liquid level, the resonant frequency is different. Thus, measurement of the oscillation frequency provides a measure of the liquid level.

SUMMARY OF THE INVENTION

One aspect of the invention is an opto-electric levelmeter for measuring the level of liquid in a container, comprising: a sensor that has at least a light emitting diode and a phototransistor. The sensor is operable to provide a sensor output signal whose frequency is related to the distance of the sensor from the surface of the liquid. More specifically, this distance is an "optical link" and is connected into the feedback loop of an oscillation circuit within the sensor. The sensor delivers this output signal to a remote monitor that has level detection circuitry for converting the sensor output signal into a signal representing the level of liquid in the container. The monitor has an adjustment circuit that permits adjustment of both the high and the low level of the level detection circuitry.

One advantage of the levelmeter is the low cost of its sensor. The sensor may be used with a remote monitor and is easy to install. It is not invasive as is a float type levelmeter, and it does not require a wide orifice as does an ultrasonic type levelmeter.

Because the sensor output is a frequency not an amplitude, the signal may be transmitted long distances. Resistance variations on a transmission line are less likely to affect the signal readings. The sinusoidal oscillations generate low electromagnetic interference.

The levelmeter has a built in signal transmitter, in that the same wire that delivers electrical energy to the sensor may also be used to transmit the sensor output signal to the remote monitor. Two independent settings, one for low level and one for a full level, permit the use of one sensor configuration for different container sizes, where the level of fullness is provided to the user as a percentage. The device may also be quickly and easily calibrated.

DETAILED DESCRIPTION OF THE INVENTION

Figure 1:
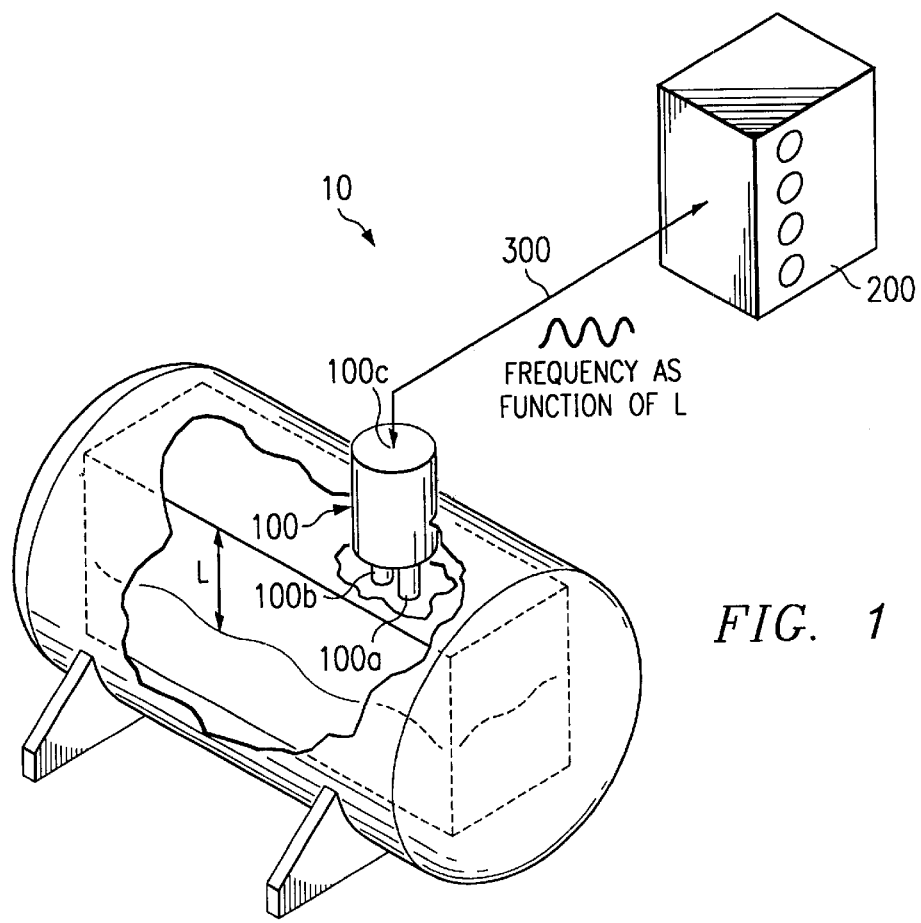
FIG. 1 illustrates a tank containing a liquid and having a levelmeter in accordance with the invention.

FIG. 1 illustrates a tank containing a liquid, fitted with a level meter 10 in accordance with the invention. Although in the example of FIG. 1; levelmeter 0 is used with a closed container, it mat also be used with open containers and frowpaths.

Levelmeter 10 has two main components: a sensor 100 and a remote monitor 200. Sensor 100 is connected to monitor 200 by means of a single cable and ground connection. Cable 300 carries signals in two directions. It carries an operating voltage from monitor 200 to sensor 100, as well as a sensor output signal from sensor 100 to monitor 200. A single port 100c in the sensor circuitry is used for this bi-directional electrical transmission.

Sensor 100 is an electro-optic probe installed in the upper portion of the container above the surface of the liquid contained therein. A light emitting diode (LED) 100a emits light, which is reflected from the surface of the liquid. A phototransistor 100b detects the reflected light. As explained below in connection with FIG. 4, phototransistor 100b provides an "optical feedback" to an oscillation circuit. A variable impedance oscillates as a function of the distance, L, between the sensor 100 and the surface of the liquid in the tank.

Figure 2:
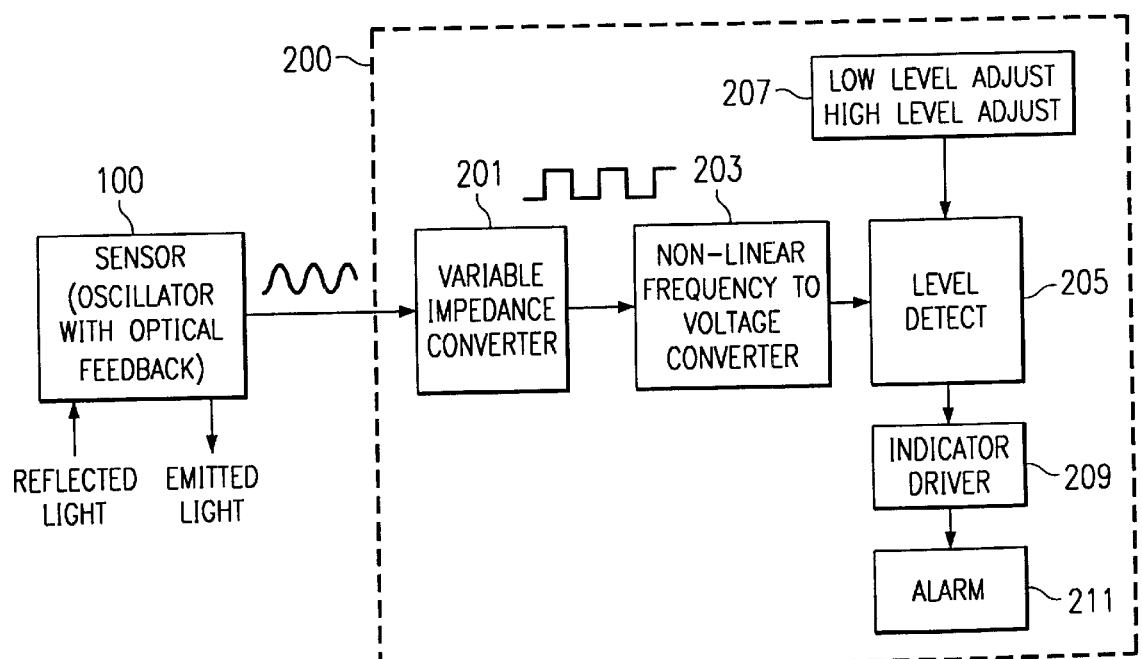
FIG. 2 illustrates the operation of the levelmeter of FIG. 1.

FIG. 2 illustrates the basic process of using levelmeter 10 to measure liquid level in a container.

As stated above, sensor 100 emits light to the surface of the liquid and detects the reflected light. This reflected light is used as optical feedback to an oscillation circuit. The output from sensor 100 is an analog signal whose frequency represents impedance variations as a function of L.

The relationship between L and F is generally logarithmic because the light propagates as a conical section of a sphere. However, reducing the angle of dispersion of LED 100a will make the relationship more linear.

Within monitor 200, a variable impedance conversion circuit 201 converts the sinusoidal output of sensor 100 to a squarewave. A frequency to voltage conversion circuit 203 operates non-linearly to provide a linearized voltage response curve inverse to that of the frequency.

Figure 3A:
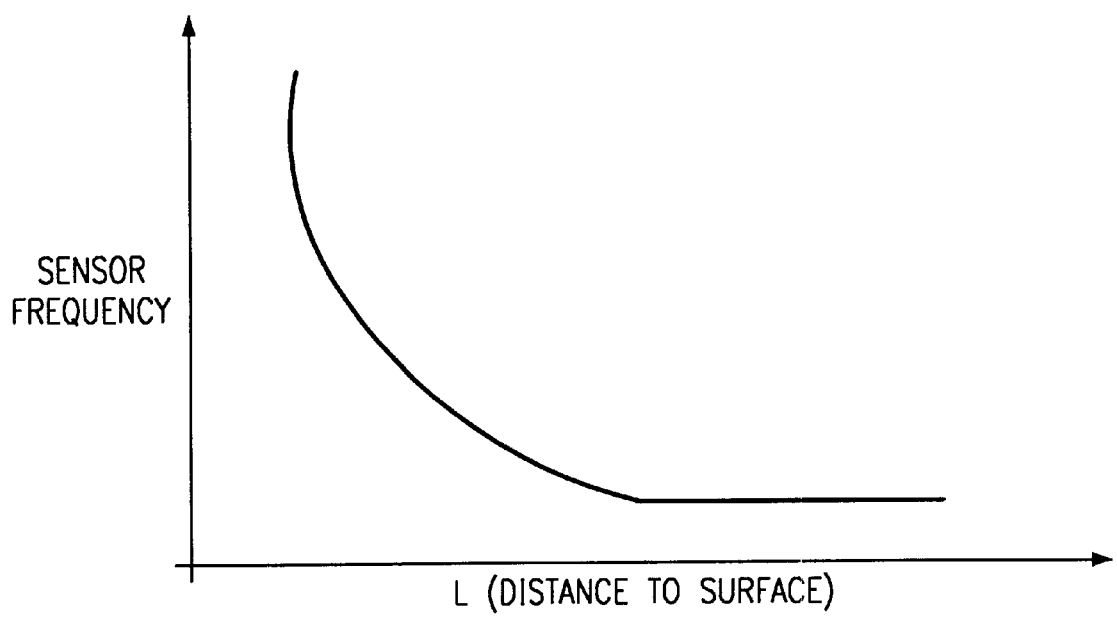
FIGS. 3A and 3B illustrate the relationship between the sensor output signal and the output of the non linear conversion of FIG. 2.
Figure 3B:
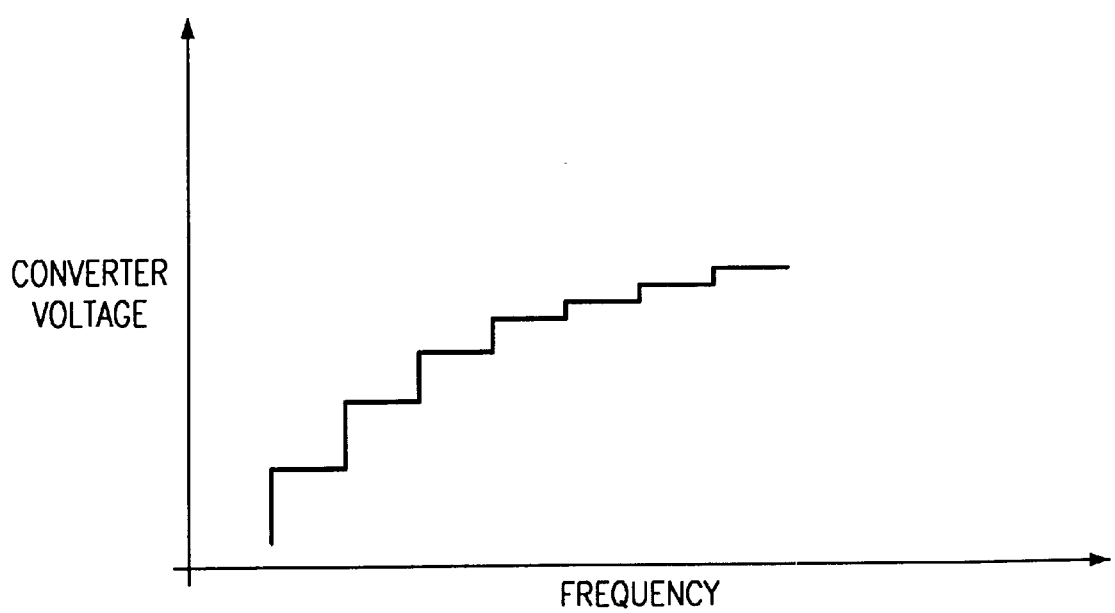

FIGS. 3A and 3B illustrate the relationship between the response of sensor 100 and the output of conversion circuit 203. More specifically, FIG. 3A illustrates the frequency-distance response of sensor 100. FIG. 3B illustrates the output voltage of conversion circuit 203, which is proportional to L in a more linear manner. The linearization is accomplished with an inverse transfer function.

Referring again to FIG. 2, a level detector 205 translates the current signal to a signal representing the fullness level of the container. Level detector 205 is adjusted with an adjustment circuit 207 for both low level and high level. This may be accomplished with a pair of potentiometers, as described below in connection with FIG. 4. The ability of monitor 200 to be adjusted for both the low and high level permits a single embodiment of levelmeter 10 to be used for different tank sizes.

The output of level detector 205 is delivered to an indicator driver 209, which drives whatever elements are used to display a measurement for the user. For example, driver 209 may be used to drive a numerical LED display. An alternative display comprising a column of LEDs is explained below.

A alarm circuit 211 may be used to deliver a signal to a remote location or sound an alarm when the liquid is at an undesirably low or high level.

Figure 4:
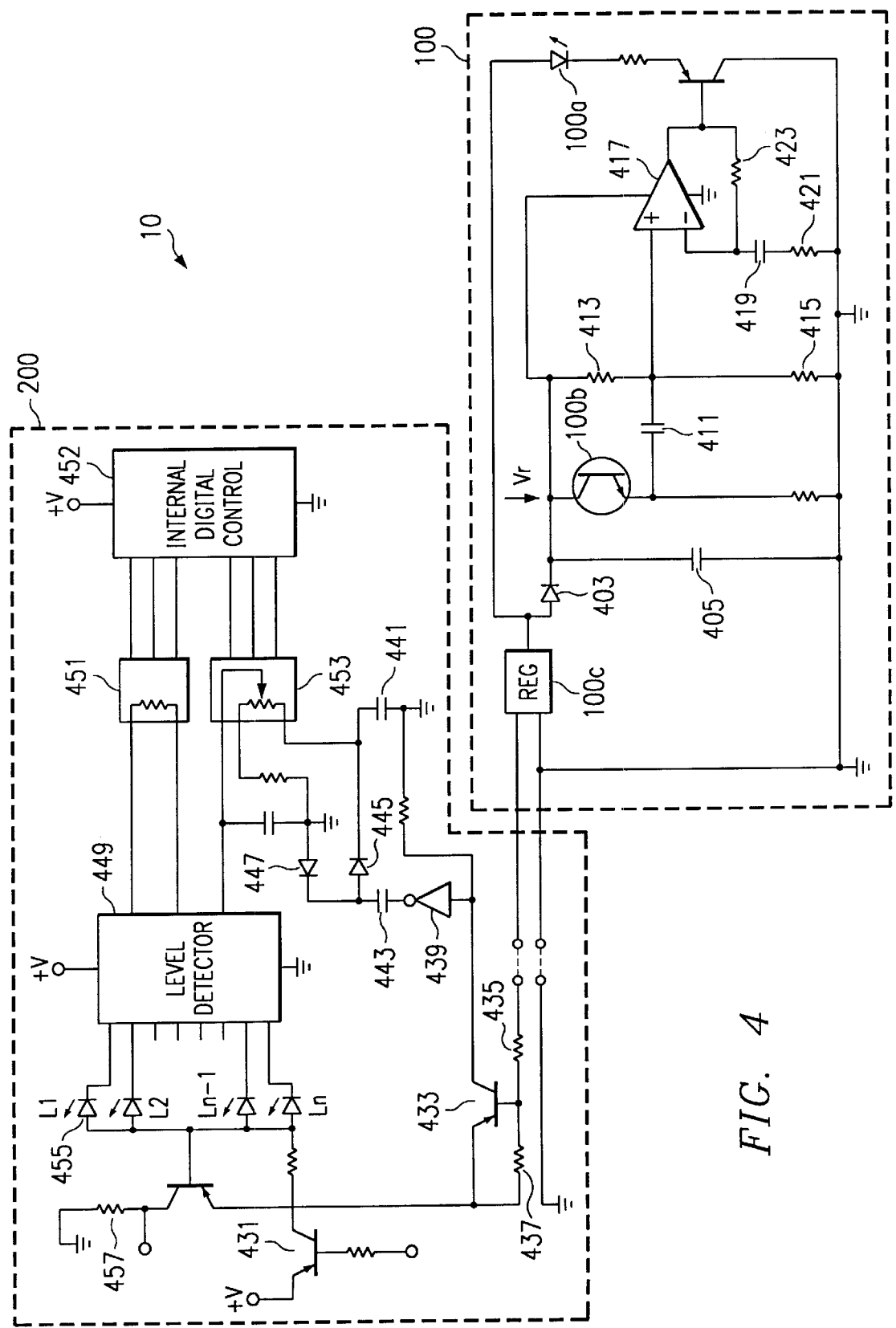
FIG. 4 illustrates one example of electronics circuitry for implementing the levelmeter.

FIG. 4 illustrates one example of electronics circuitry for implementing levelmeter 10. Sensor 100 is a two terminal device. As stated above, the same port 100a is used to both receive the electrical energy and to transmit a sensor output signal.

Sensor 100 receives DC voltage from monitor 200 via a regulator 401. The regulated voltage is divided by diode 403 to provide a first voltage to a low current section of the sensor circuit, which is isolated from high current variations of the power section of the sensor circuit. Capacitor 405 stores energy during high current peaks through LED 100a.

The light emitted by LED 100a and reflected by the liquid surface is sensed and converted to voltage variations by optical transistor 100b. Capacitor 411 provides low frequency isolation and phase shift.

Resistors 413 and 415 provide a reference voltage for the non inverting input of operational amplifier 417. This reference voltage is one-half the supply voltage, Vr. Operational amplifier 417 provides voltage gain. Capacitor 419 and resistor 421 set a suitable bandwidth and amplification with the operational amplifier feedback, with resistor 423 limiting the gain. Using "optical feedback" from optical transistor 100b, a closed loop circuit within sensor 100 acts as a frequency modulated oscillator that oscillates at the resonant frequency of a loop that includes the optical link. The distance between sensor 100 and the surface of the liquid is the frequency modulator. Thus, the oscillation frequency is dependant on the distance, L. The sinusoidal waveform reduces interference and optimizes sensitivity.

The frequency of oscillation is a function of a number of internal and external factors. These factors include the following: internal electronics gain and phase shift, optic dispersion geometry, molecular structure of the reflecting surface, light intensity of the illumination, ambient light, and distance to the reflecting surface. By making each of these factors substantially constant except the distance to the reflecting surface, and by providing an appropriate phase shift, the oscillation can then be related to the level of fluid inside the container.

The power supply to monitor 200 is regulated by transistor 431. Transistor 431 can be switched with positive and negative voltage, which permits automatic monitoring or manual activation. Transistor 433 provides voltage to sensor 100 using a small-valued resistor 435 for short circuit protection against base-emitter damage.

Resistor 437 provides current to voltage conversion. When the voltage across resistor 437 is over 0.7 volts, transistor 433 is saturated. The Schmitt trigger inverter 439 switches to a low state. When sensor 100 oscillates, the output of inverter 439 oscillates at the same frequency but as a square waveform.

Capacitors 441 and 443 and diodes 445 and 447 operate as a non-linear frequency-to-voltage converter. The voltage across capacitor 441 varies according to a response curve inverse to that of the frequency and is proportional to L. This response curve has the characteristics of the curve explained above in connection with FIG. 3B.

The voltage across capacitor 441 is connected to a level detector circuit 449, whose output represents the liquid level being measured. An example of a suitable level detector circuit 449 is the LM31914, manufactured by National Semiconductor Co.

Potentiometers 451 and 453 and their associated control circuitry 452 provide digital potentiometers with self-contained non volatile memory. Potentiometer 451 sets the high level reference, and potentiometer 453 sets the low level reference. Typically, these devices operate with a slider, whose settings are stored in the integrated memory. If the output of levelmeter 10 is expressed in terms of "percent full", then the same configuration of levelmeter 10 can be used for different container sizes.

Each output of level detector 449 is connected to a different one of a set of LEDs 455. Each LED 455 is associated with a different level of the container. For example, if the output of level detector 449 is at the highest level, the LED represent "full" would be lit. An over/under level indicator circuit 457 may also be used to provide an alarm when the container is over or under a predetermined limit.

As described above, the output information from sensor 100 is frequency information, which permits a simple communications link between sensor 100 and monitor 200. However, if desired, a current transmitter could be used.

Figure 5:
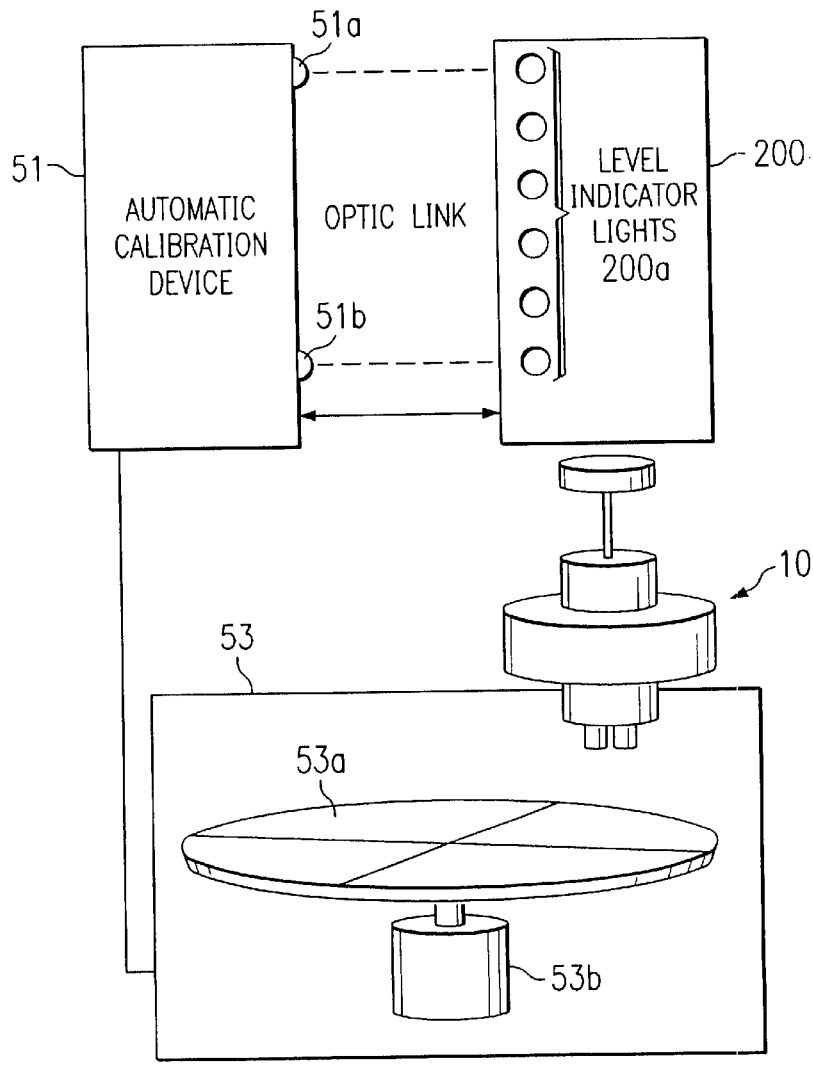
FIG. 5 illustrates how the levelmeter may be automatically calibrated.

FIG. 5 illustrates how levelmeter 10 may be automatically calibrated. In FIG. 5, it is assumed that levelmeter 10 provides readings in the form of a series of LEDs 200a. For example, a reading in which the bottom LED is lit would indicate a low liquid level.

A light-isolated sensor housing 53 contains a segmented disk 53a, which is rotated by a motor 53b. Each segment of disk 53a has reflective characteristics similar to those within the container in which sensor 100 will actually be used. Sensor 100 is placed in housing 53. A first segment is placed in view of sensor 100, representing low level conditions. Then, a second segment is placed in view of sensor 100, representing high level conditions. For each position of disk 53a, the appropriate LED 200a turns on.

Calibration unit 51 has two phototransistors 51a and 51b, one of which detects the "full" LED 200a and the other of which detects the "low" LED 200a. Calibration unit 51 then delivers a calibration signal to monitor 200, which sets potentiometer 451 or 453. This automatic calibration could be similarly accomplished with any type of optical display other than LEDs.

Figure 6:
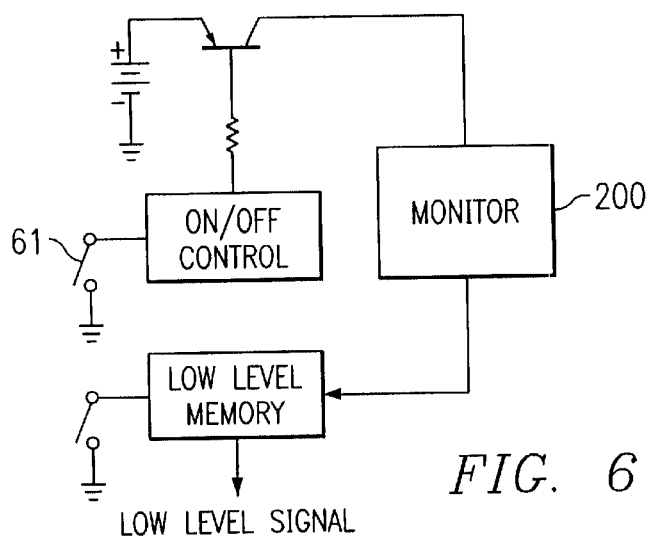
FIG. 6 illustrates how the level meter may be used for remote monitoring by a service provider.

FIG. 6 illustrates how monitor 200 may be activated and used to signal low level conditions. A switch 61 may be manually or automatically activated. As an example of manual activation, where levelmeter 10 is used for a propane gas tank, monitor 200 could be placed in a residence. The gas level could be checked by pressing a button (switch 61) connected to monitor 200. A low level signal could result in an alarm or other signal to the user. The same signal could be delivered to remote location, such as the office of a liquid fuel provider. The fuel provider might also remotely activate switch 61, thereby providing remote monitoring without the need for intervention by the homeowner.

Other Embodiments

Although the present invention has been described in detail, it should be understood that various changes, substitutions, and alterations can be made hereto without departing from the spirit and scope of the invention as defined by the appended claims.

What is claimed is:

1. An opto-electric levelmeter for measuring the level of liquid in a container, comprising:

a sensor having at least a light emitting diode and a phototransistor, said sensor operable to provide a sensor output signal whose frequency is related to the distance of the sensor from the surface of the liquid;

a monitor that receives the sensor output signal and that has at least linearizing circuitry for linearizing the sensor output signal, level detection circuitry for converting the output signal to a signal representing the level of liquid in the container, and adjustment circuitry for adjusting the level detection circuitry.

2. The levelmeter of claim 1, wherein the monitor delivers electrical energy to the sensor via an electrical link.

3. The levelmeter of claim 2, wherein the monitor receives the sensor output signal on the same electrical link that is used to deliver electrical energy to the sensor.

4. The levelmeter of claim 1, wherein the sensor has a light emitting diode for emitting light to the surface of the liquid and an optical transistor for detecting light reflected from the surface.

5. The levelmeter of claim 4, wherein the sensor further has an oscillation circuit for providing the sensor output signal, the oscillation circuit having a feedback loop that includes the optical link between the photodiode and the optical transistor.

6. The levelmeter of claim 1, wherein the linearization circuit represents an inverse transfer function.

7. The levelmeter of claim 1, wherein the adjustment circuitry comprises at least one potentiometer.

8. The levelmeter of claim 1, wherein the adjustment circuitry permits adjustment of both a low level and a high level of the level detection circuitry.

9. The levelmeter of claim 1, wherein the monitor further has impedance conversion circuitry for converting the sensor output signal from a sinusoidal signal to a square wave signal.

10. An opto-electric sensor that provides an output signal representing the level of liquid in a container, comprising:

a light emitting diode that emits light toward the surface of the liquid;

an optical transistor that detects light reflected from the surface of the liquid, thereby providing an optical link between the light emitting diode and the optical transistor;

an oscillation circuit formed in part by the optical link between the light emitting diode and the optical transistor, wherein the oscillation circuit generates a sensor output signal whose frequency is representative of the level of liquid in the container; and a electrical port for delivering the sensor output signal to a remote monitor.

11. The sensor of claim 10, wherein the oscillation circuit has an operational amplifier and wherein the optical link is in a feedback loop of the operational amplifier.

12. The sensor of claim 10, wherein the sensor receives electrical energy from a remote source via an electrical link.

13. The sensor of claim 10, wherein the sensor output signal is transmitted from the sensor by the same electrical port that delivers electrical energy.

14. The sensor of claim 10, further comprising a current transmitter for converting the sensor output signal to a signal in which the liquid level is represented by current information.

15. A method of sensing the level of liquid in a container, comprising the steps of:

installing a sensor internal to the container;

using the sensor to emit light to the surface of the liquid, to detect light reflected from the surface, and to generate a sensor output signal whose frequency represents the level of liquid in the container;

transmitting the sensor output signal to a remote monitor;

linearizing the sensor output signal; and converting the sensor output signal to a monitor output signal representing the level of liquid in the tank, such that the liquid level may be communicated to a user.

16. The method of claim 15, further comprising the step of calibrating the sensor by placing, under the sensor, a surface whose reflective characteristics are the same as a known level of the liquid.

17. The method of claim 15, wherein the sensor output signal is a frequency modulated signal, whose frequency represents the level of liquid.

18. The method of claim 15, further comprising the step of delivering electrical energy to the sensor and wherein the transmitting step is accomplished using the same electrical link as the delivering step.

19. A method of sensing the level of liquid in a container, comprising the steps of:

installing a sensor internal to the container;

calibrating the sensor by placing, under the sensor, a surface whose reflective characteristics are the same as a known level of the liquid;

using the sensor to emit light to the surface of the liquid, to detect light reflected from the surface, and to generate a sensor output signal whose frequency represents the level of liquid in the container;

transmitting the sensor output signal to a remote monitor; and using the monitor to convert the sensor output signal to a monitor output signal representing the level of liquid in the tank, such that the liquid level may be communicated to a user.

20. The method of claim 19, further comprising the steps of displaying the liquid level in the form of an optical display, detecting the optical display, delivering a calibration signal representing the optical display to the monitor, and using the calibration signal to automatically adjust the monitor.

* * * * *